United States Patent
Rusch et al.

[11] Patent Number: 6,130,175
[45] Date of Patent: Oct. 10, 2000

[54] INTEGRAL MULTI-LAYERED ION-EXCHANGE COMPOSITE MEMBRANES

[75] Inventors: Greg Rusch, Wilmington, Del.; Jeffrey A. Kolde, Baltimore, Md.

[73] Assignee: Gore Enterprise Holdings, Inc., Newark, Del.

[21] Appl. No.: 09/315,997

[22] Filed: May 21, 1999

Related U.S. Application Data

[63] Continuation of application No. 08/931,909, Apr. 29, 1997.

[51] Int. Cl.$^7$ ........................................ B32B 5/32
[52] U.S. Cl. .................... 442/77; 428/306.6; 428/316.6; 428/319.3; 442/221
[58] Field of Search ............................ 428/306.6, 316.6, 428/319.3; 442/77, 221

[56] References Cited

U.S. PATENT DOCUMENTS

| | | |
|---|---|---|
| 4,311,567 | 1/1982 | White . |
| 4,433,082 | 2/1984 | Grot . |
| 4,528,083 | 7/1985 | LaConti et al. . |
| 5,041,195 | 8/1991 | Taylor et al. . |
| 5,133,842 | 7/1992 | Taylor et al. . |
| 5,183,713 | 2/1993 | Kunz . |
| 5,190,813 | 3/1993 | Ohashi et al. ........................ 428/319.3 |
| 5,350,643 | 9/1994 | Imahashi et al. . |
| 5,547,551 | 8/1996 | Bahar et al. ............................ 204/296 |
| 5,599,614 | 2/1997 | Bahar et al. ............................ 442/171 |
| 5,635,041 | 6/1997 | Bahar et al. ............................ 204/282 |

FOREIGN PATENT DOCUMENTS

62-240627  9/1987  Japan .

*Primary Examiner*—Blaine Copenheaver
*Attorney, Agent, or Firm*—Allan M. Wheatcraft

[57] ABSTRACT

The present invention provides a distinct advancement over presently known ion-exchange composite membranes, and the techniques for making such membranes. In one embodiment of the present invention, this is accomplished by a thin integral composite membrane comprised of a microporous polymer film, such as expanded polytetrafluoroethylene having a porous microstructure defined by polymeric fibrils, which provides a reinforcing support that supports an ion-exchange polymer resin or material on one side of the porous polymeric film and supports another different ion-exchange polymer resin on the other side. Thus, the invention uses two different ion-exchange resins on each side of a porous polymeric support film. By employing ionic exchange resins which differ in structure, functional groups or equivalent weight, or a combination of such, a wide variety of composites can be made and tailored to specific end uses.

28 Claims, 1 Drawing Sheet

INTEGRAL MULTI-LAYERED ION-EXCHANGE COMPOSITE MEMBRANES

This is a continuation of co-pending application Ser. No. 08/931,909 filed Apr. 29, 1997.

FIELD OF THE INVENTION

An integral multi-layered composite ion-exchange membrane is provided which is useful in electrolytic processes and other chemical and physical separations.

BACKGROUND OF THE INVENTION

Ion-exchange composite membranes (IEM) are used in fuel cells as solid electrolytes. A membrane is located between the cathode and anode and transports protons formed near the catalyst at the hydrogen electrode to the oxygen electrode thereby allowing a current to be drawn from the cell. These polymer electrolyte fuel cells are particularly advantageous because they operate at lower temperatures than other fuel cells. Also, these polymer electrolyte fuel cells do not contain any corrosive acids which are found in phosphoric acid fuel cells.

Ion-exchange composite membranes are also used in chloralkali applications to separate brine mixtures to form chlorine gas and alkali hydroxide. The membrane selectively transports the alkali metal ions across the membrane while rejecting the chloride ions.

Additionally, IEMs are useful in the areas of diffusion dialysis, electrodialysis and for pervaporation and vapor permeation separations.

In electrodialysis, electrolytes can be divided into a concentrated and a diluted stream. This can be accomplished by arraying anionic and cationic exchange membranes in a filter press arrangement. Alternating compartments between the membranes are filled with either the feed stream or the product stream. An electric field is applied across this series array by inserting electrodes in the end compartments.

In diffusion dialysis, a stream of contaminated acid or base can be separated from dissolved metal ions, colloidal or non-ionic species. The acid or base can than be returned to the original process. A diffusion dialysis system may consist of a filter press type arrangement with anion or cation exchange membranes between compartments of that system. Alternate compartments are filled with either the waste material or water. The desired ions diffuse through the membrane. The undesired ions are rejected and removed as waste.

IEMs must have sufficient strength to be useful in their various applications. For example, IEMs that are not reinforced (such as those commercially available from E. I. DuPont de Nemours, Inc., and sold under the registered trademark Nafion®) are inherently weak. Often the need for increased strength requires the membranes to be made thicker which decreases their ionic conductance.

As seen below, fluorinated ion-exchange polymers having carboxylic acid and/or sulfonic acid functional groups, and salts thereof, are known, as is their use in fuel cells and chloralkali electrolysis cells and the like. In such uses, the polymers are generally used as one layer of a membrane laminate. Multi-layer laminates suffer from delamination under certain operating conditions.

U.S. Pat. No. 4,469,744 to Grot et al. uses such polymers in a protective clothing of fabric containing a layer of the highly fluorinated ion-exchange polymer. Example 1 refers to a microporous polytetrafluoroethylene film having a thickness of 127 micrometers as described by U.S. Pat. No. 3,962,153. A solution of ion-exchange polymer is applied with the use of a vacuum. The film was then placed in an oven (under vacuum) at 120° C. for 5 hours. The final product had a thickness of about 127 micrometers (5 mils) and required the use of a vacuum to provide for impregnation of polymer.

U.S. Pat. No. 4,902,308 to Mallouk, et al. relates to a film of porous expanded PTFE having its surfaces, both exterior and internal, coated with a metal salt of perfluoro-cation exchange polymer. The base film of porous, expanded PTFE (ePTFE) had a thickness of between 1 mil and 6 mils (0.025–0.150 mm). The final composite product had a thickness of at least 1 mil (0.025 mm) and preferably had a thickness of between 1.7 and 3 mils (0.043–0.075 mm). The composite product was permeable to air and the air flow, as measured by the Gurley densometer ASTM D726–58, was found to be between 12 and 22 seconds. Therefore, this structure allows fluid to pass through.

U.S. Pat. No. 4,954,388 to Mallouk, et al. relates to an abrasion-resistant, tear resistant, multi-layer composite membrane having a film of continuous ion-exchange polymer attached to a reinforcing fabric by means of an interlayer of porous expanded PTFE. A coating of a ion-exchange resin is present on at least a portion of the internal and external surfaces of the fabric and porous expanded PTFE. The composite membrane made in accordance with the teachings of this patent resulted in thicknesses of greater than 1 mil (0.025 mm) even when the interlayer of porous expanded PTFE had a thickness of less than 1 mil (0.025 mm).

U.S. Pat. No. 5,082,472 to Mallouk, et al. relates to a composite membrane of microporous film in laminar contact with a continuous ion-exchange resin layer wherein both layers have similar area dimensions. Surfaces of internal nodes and fibrils of porous expanded (ePTFE) may be coated at least in part with ion-exchange resin coating. The membrane of ePTFE can have a thickness of about 2 mils (0.050 mm) or less and the ion-exchange layer can have a thickness of about 2 mil. The ePTFE layer of this composite membrane imparted mechanical strength to the composite structure. While the patent says the pores can be filled with the ion-exchange resin, they cannot be filled to the point where flow of fluids is blocked.

U.S. Pat. Nos. 5,094,895 and 5,183,545 to Branca, et al. relate to a composite porous liquid-permeable article having multiple layers of porous ePTFE bonded together and having interior and exterior surfaces coated with an ion-exchange polymer. This composite porous article is particularly useful as a diaphragm in electrolytic cells. The composite articles are described to be relatively thick, preferably between from 0.76 and 5 mm.

U.S. Pat. No. 5,547,551 filed Mar. 15, 1995 to Bahar, et al., describes an ion-exchange membrane of expanded porous PTFE less than 0.025mm (25 microns) in which the pores are fully impregnated with an ion-exchange material.

Japanese Patent Application No. 62-240627 and Japanese Patent No. 5-75835 relate to a coated or an impregnated membrane formed with a perfluoro type ion-exchange resin and porous PTFE film to form an integral unit. The resulting composite does not appear to be fully occluded with resin since the patent speaks only of thorough impregnation of resin solution.

None of the above described materials adequately address the current and anticipated demands for an ion-exchange membrane. There remains a distinct need for a strong, ultra-thin, integral composite ion-exchange membrane, having long term chemical and mechanical stability, very high ionic conductance, and being thin. For example, fabric reinforced ion-exchange membranes result in thick composites, which leads to operation at high voltages because the greater thickness means higher electrical resistance. Trying to make the membrane thinner only results in weaker, tear-prone membranes.

SUMMARY OF THE INVENTION

The present invention provides thin multi-layer composite membranes of ionic conductance substantially higher than other ion-exchange composite membranes.

The present invention provides a distinct advancement over presently known ion-exchange composite membranes, and the techniques for making such membranes. In one embodiment of the present invention, this is accomplished by a thin integral composite membrane comprised of a microporous polymer film, such as expanded polytetrafluoroethylene having a porous microstructure defined by polymeric fibrils, which provides a reinforcing support that supports an ion-exchange polymer resin or material on one side of the porous polymeric film and supports another different ion-exchange polymer resin on the other side. Thus, one novel aspect of the invention is the use of two different ion-exchange resins on each side of the porous polymeric support film. By employing ionic exchange resins which differ in structure, functional groups or equivalent weight, or a combination of such, a wide variety of composites can be made and tailored to specific end uses. It can be appreciated by one skilled in the art that it is the ion transport properties of the material which is important to this invention. Different ion exchange materials may have similar ionic transport properties even though the equivalent weights may differ. The ability of different ion exchange materials to absorb polar compounds such as water, can be related to their ion transport properties. This is influenced by the equivalent weight and the molecular structure. Equivalent weight may optionally be expressed in terms of milliequivalent/gm. The present invention provides a distinct advantage with respect to ion exchange materials that exhibit poor physical properties upon absorption of polar compounds—such as water.

For example, one ion-exchange resin can be cationic and the other anionic. In this instance, one will allow or prevent passage of certain chemical species and the other will allow or prevent passage of different chemical species. Similarly, one can contain carboxylic functionality; the other, sulfonic functionality; or, both can contain the same functionality and provide selective different transmission or barrier properties to chemical species through varying the equivalent weight of the two. In this case, the higher equivalent weight resin is more resistant to anion ion migration. In addition, the two ion-exchange resins can be identical in terms of chemical structure and equivalent weight but differ in that one resin (first resin) contains a filler material that influences passage of chemical moieties; while the other or second resin either has no filler material or has a different filler material that interacts differently with chemical moieties than does the first filler in the first resin.

Both ion-exchange resin materials completely penetrate into the pores of the microporous polymeric film at least near the surface of the polymeric film and occlude all the pores of the polymeric film at the surface portion. Thus, the resulting composite is bulk-fluid impermeable and free of pinholes. Preferably, the two ion-exchange resins will completely fill the pore volume of the polymeric film, and thus the pores will be completely occluded. The layers should be continuous because any holes would allow undesired species to penetrate the membrane.

The micropores of the polymer film extend from one side to the other.

It is important that the two ion-exchange polymer resin layers be different in some respect in order to provide the desired performance. In some instances, one of the ion-exchange polymer resin materials will have its functional groups substantially all carboxylic groups (—COOM where M is $H^+$ or a metal cation, $Na^+$, $K^+$, or $NH^+_4$); and the other ion-exchange polymer resin material will have functional groups that are substantially all sulfonic groups (—$SO_3M$ where M is $H^+$ or a metal cation ($Na^+$, $K^+$, or $NH^+_4$). In other instances, they both can be sulfonic. Both types of ion-exchange resin materials stop or prevent passage of certain anions. To some extent, the sulfonic ion-exchange resin material allows passage of cations, such as $Na^+$. Both retard passage of $OH^-$ ions, but the carboxylic resins are better in this respect. In some applications, all that is needed is for the two ion-exchange resin materials to have different equivalent weights. For example, both can contain only sulfonic functionality and in those instances, the resin with the higher equivalent weight will retard transport of $OH^-$ ions to a greater extent.

The ion-exchange resin materials include such well known ion-exchange resins as fluorinated or non-fluorinated polystyrene based sulfonates and sulfonated polytetrafluoroethylenes. The resins are preferably fluorinated and more preferably perfluorinated. Particularly preferred are resins containing a sulfonic acid moiety, or a carboxylic acid moiety or a phosphonic acid moiety, or a sulfonimide moiety. They can also be ionic polymers derived from polyvinyl alcohol (PVA), or styrene-based polymers. To make ion-exchange resins of these, the PVA can be mixed with a metal salt. The styrene can be sulfonated. Copolymers of trifluorostyrene and substituted trifluorostyrene or similar comonomers which have been sulfonated can be used.

The composite membrane formed by the ion-exchange resins and the porous polymer substrate may be bonded to a reinforcement backing of a woven or nonwoven material.

In one embodiment of the present invention, the microporous polymeric film comprises a material having a porous microstructure defined substantially of nodes interconnected with fibrils, such as expanded porous polytetrafluoroethylene. The composite is essentially air impermeable.

A method for making an ion-exchange membrane of the present invention is provided which comprises the following steps:

(a) providing a membrane having a porous microstructure, preferably with a thickness of less than 0.05 milimeters (50 micron).

(b) impregnating -the membrane on each side with a different ion-exchange material so as to render the membrane essentially air impermeable; and (c) optionally, heating said impregnated membrane to an elevated temperature above 60° C. for a predetermined period of time.

The foregoing and other aspects will become apparent from the following detailed description of the invention when considered in conjunction with the accompanying drawing figures.

DETAILED DESCRIPTION OF THE INVENTION

Figure 1:
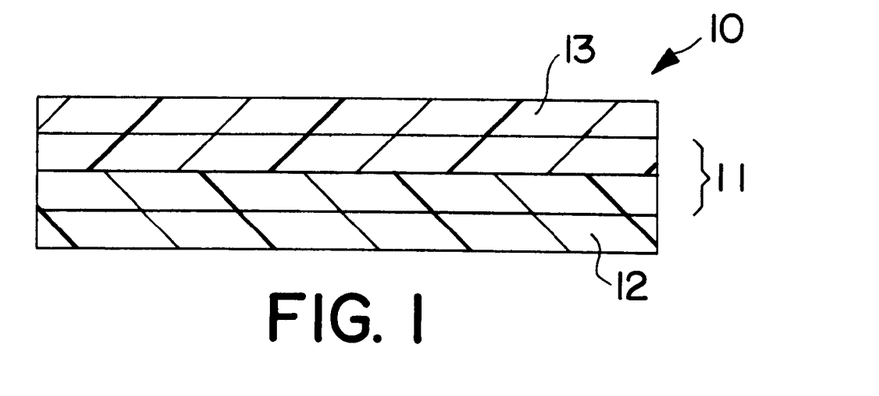
FIG. 1 is a schematic cross-section of a composite membrane of the present invention that is fully impregnated with the ion-exchange material.
Figure 2:
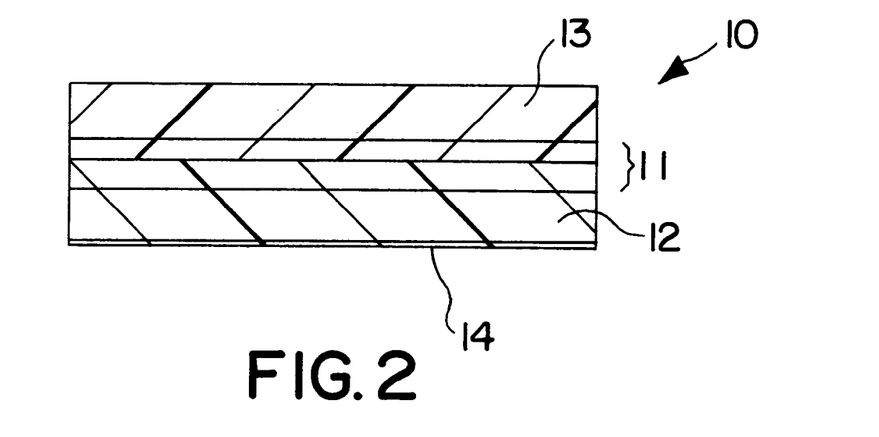
FIG. 2 is a schematic cross-section of the composite membrane of the present invention that is fully impregnated with the ion-exchange material and including a backing material attached thereto.
Figure 3:
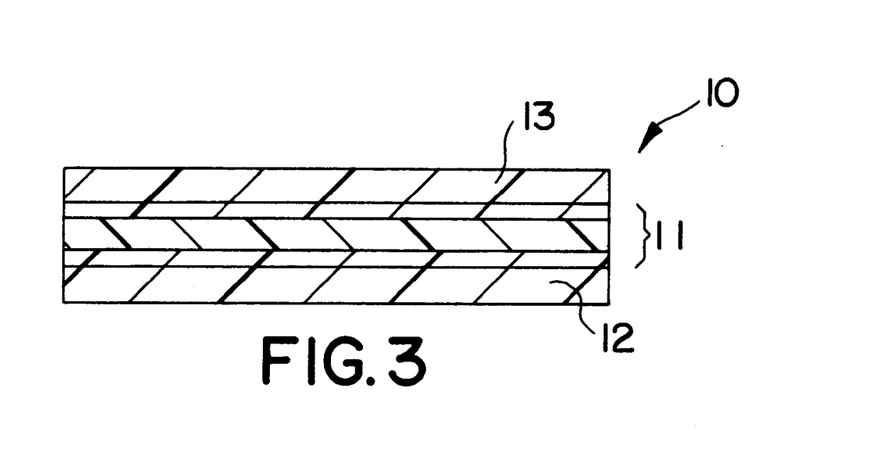
FIG. 3 is a schematic cross-section of a composite membrane of the present invention that is impregnated near each surface by the ion-exchange materials.

As shown in FIGS. 1–3, a composite membrane 10 is provided which includes microporous polymer film 11 and ion-exchange resin materials 12 and 13 embedded in the pores on either side of film 11 so as to fully occlude the pores at least near the surfaces of the microporous film..

It is important that ion-exchange resins provide a continuous covering of the surfaces of microporous polymer film 11 in order to perform their function of providing an ion-exchange function. The embedding of a portion of the resins into film 11 improves the adhesion between the two. By employing microporous structures, thin composites can be obtained which provide improved migration of chemical substances through the composites. The ion-exchange resin materials 12 and 13 render the pores of microporous polymer film 11 completely occluded, as in FIGS. 1 and 2, or render the pores fully occluded at and near the surfaces of the film, as in FIG. 3. Thus, the ion-exchange resins are securely attached to the film 11 because of the penetration of the resins into the microporous structure of the film 11. FIG. 2 also depicts backing support 14, which can be any type of support such as fabric.

The Microporous Polymeric Films

Suitable microporous polymer films include those made from polyolefins, polyamides, polycarbonates, cellulosics, polyurethanes, polyesters, polyethers, polyacrylates, copolyether esters, copolyether amides, chitosan, and fluoropolymers. Suitable fluoropolymers include membranes of porous polytetrafluoroethylene, more preferably a membrane of expanded porous PTFE (sometimes referred to as ePTFE) produced by the process taught in U.S. Pat. No. 3,953,566 (to Gore).

Microporous films of other polymers such as thermoplastic polymers are described in U.S. Pat. No. 4,539,256 to Sherman, incorporated herein by reference. Preparation of microporous polyurethanes is described in U.S. Pat. No. 4,429,000. Preparation of microporous polymeric films, especially microporous polyolefins (polyethylene, polypropylene, butenes, pentenes, etc.) is described in British Patent 1339207. Preparation of microporous films by stretching is described in U.S. Pat. No. 4,726,989 where use of polyamides, polyolefins, polystyrenes, polyvinylidene fluoride, and polycaprolactanes are described. Preparation of microporous films by liquid extraction is described in U.K. Publication No. GB 2,026,381. Stretching is described in U.S. Pat. No. 4,100,238. Preparation by film fracture, hot stretching is described in U.S. Pat. No. 3,679,540. All these patents are incorporated by reference for their description of the polymers.

GB 2,026,381 discloses the preparation of membranes having a porous surface by blending polymer with a liquid component to form a binary two-phase system which, in the liquid aggregate state, has a region of miscibility and a region with miscibility gaps, forming a sheet of the blend, casting the film into a bath of the liquid component and removing the liquid component to provide porosity. The resultant non-oriented porous sheet has a relatively low tensile strength.

U.S. Pat. Nos. 3,953,566, 3,962,153, 4,096,227, 4,110,392, 4,187,390 and 4,194,041, all incorporated by reference, describe the preparations of porous articles, including microporous sheets, formed of polytetrafluoroethylene (PTFE), a non-thermoplastic polymer, which is characterized by having a microstructure of nodes connected by fibrils. Such articles are produced by extruding a paste comprised of PTFE particles and a lubricant, removing the lubricant and stretching and annealing the resultant product. The resultant product is a sintered, oriented porous film of PTFE.

U.S. Pat. Nos. 4,100,238 and 4,197,148, incorporated by reference, describe the preparation of microporous films by extruding a two component blend, solvent leaching one dispersed component and stretching the resultant leached film to obtain a desired porosity. The blend consists of polymer and a leachable, non-miscible substance. Once the leachable dispersed polymer phase is removed and the film oriented, a porous film results.

U.S. Pat. No. 3,679,540, incorporated by reference, discloses a method for making a microporous polymer film by cold stretching an elastic polymer film until porous surface regions are formed by film failure, hot stretching the cold stretched film until fibrils and pores or open cells are formed and then heat setting the resultant film. Controlled porosity is generally not attained in such films because they do not always uniformly fibrillate to a specific pore size.

Certain U.S. patents disclose the preparation of porous polymer film by blending into the polymer non-miscible leachable particulate substance such as starch, salts, etc., forming a sheet and leaching the particulate substance from the polymer sheet. Such U.S. Patents, incorporated by reference, include: U.S. Pat. Nos. 3,214,501 and 3,640,829, U.S. Pat. No. 3,870,593 discloses the preparation of a microporous polymer sheet by blending non-miscible, non-leachable filler into the polymer, forming a sheet of the blend and stretching the sheet to form pores which are initiated at the sites of the filler particles.

U.S. Pat. No. 4,539,256 which patent is hereby incorporated by reference, teaches a method of making a microporous sheet which comprises the steps of melt blending a crystallizable thermoplastic polymer with a compound which is miscible with the thermoplastic polymer at the polymer melting temperature but immiscible on cooling below the polymer melting temperature, forming a sheet of the melt blend, cooling the sheet to a temperature at which the compound becomes immiscible with the polymer to cause phase separation between the thermoplastic polymer and the compound to provide a sheet.

Such porous polymer films or sheets will preferably have a porosity of greater than 35%. More preferably, the porosity should be between 70–95%. The thickness of the film is preferably less than 2 mil (0.05 mm, 50 micrometers). Preferably the thickness is between 0.06 mils (1.5 $\mu$m) and 1.6 mils, and most preferably the thickness is between 0.50 mils (0.013 mm) and 1.50 mils (0.038 mm).

A preferred film is expanded porous PTFE commercially available in a variety of forms from W. L. Gore & Associates, Inc., under the trademark GORE-TEX® membrane. The porous microstructure of such expanded porous PTFE films either comprises nodes interconnected by fibrils, or comprises substantially fibrils with substantially no nodes present. Preferred porous expanded PTFE films can be characterized as having a bubble point between 10 and 60 psi; and an air flow between 20 Frazier and 10 Gurley seconds. It may also have a pore size distribution value between 1.05 and 1.20; and a ball burst strength between 0.9 and 17 pounds/force.

The Ion-exchange Polymeric Resins

The ion-exchange polymeric materials used can be any ion-exchange materials that will provide the desired result. The materials are preferably fluorinated because the material should be substantially inert to chemical activity and should be heat resistant.

The ion-exchange polymeric material will of course contain ionic functionality, preferably sulfonic moieties, carboxylic moieties or phosphonic moieties. The functional groups are present in an amount sufficient to impart ion-exchange properties to the polymer. An equivalent weight too high results in the electrical resistivity being too high. But if the equivalent weight is too low, mechanical strength becomes poor. The ionic functionality will usually be provided by carboxylic, sulfonic or phosphonic groups present either on the polymer backbone or present on pendant groups that extend from the polymer backbone in a recurring fashion. The polymer backbone will preferably be a fluorinated hydrocarbon backbone chain. The functional group preferably will have the structure —COOM, —SO$_3$M or PO$_3$M$_2$, where M is hydrogen, a metallic cation or NH$^+_4$. If a metallic cation, it will preferably be an alkali metal or an alkaline earth metal, such as Na$^+$, K$^+$ or the like.

For carboxylic functionality, the pendant side chains which carry the above functional groups may have at the terminal end of the side chain a group of the formula:

or where V is —COOM, Z is —F or —CF$_3$ and τ is an integer of 1–12, preferably 1 or 2, as described in U.S. Pat. No. 4,437,951 to DuPont, all of which is incorporated by reference for its disclosure of both carboxylic and sulfonic functionality.

The sulfonyl polymers with which the present invention is concerned are typically polymers having a fluorinated hydrocarbon backbone chain to which are attached the sulfonic containing functional groups as pendant side chains. For sulfonic polymers, terminal portion of the side chains can be:

—CFRSO$_3$M,
—CF$_2$CFRSO$_3$M, or
—OCF$_2$CF$_2$—SO$_3$M, or the like where R is F, Cl, or perfluoroalkyl and M is as described earlier.

For phosphoric polymers, the same sort of pendant groups are present.

Other ion-exchange resins useful herein, in addition to the fluorinated carboxylic resins and the fluorinated sulphonic and phosphoric resins described above, include, but are not limited to, polyvinyl alcohol (PVA), divinyl benzene/styrene copolymers, provided they have the requisite functional groups pendant chains. The polymers can be mixed with a metal salt to obtain the desired functionality. A sulfonated polymer of trifluorostyrene, such as homopolymer or a copolymer with tetrafluoroethylene, can be used.

It is understood that the foregoing description of ion-exchange resins is not limited and is representative. It is understood that the invention can employ any polymer type of ion-exchange material. Thus, as seen above, not only do the resins include ones with the functional group, a part of the polymer, ones where the functional group are provided by an additive to the polymer.

The ion-exchange resins used in the invention can be prepared by general polymerization techniques developed for homo and copolymerizations of fluorinated ethylenes, particularly those employed for tetrafluoroethylene which are described in the literature. Nonaqueous techniques for preparing the copolymers include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0°–200° C. and at pressures in the range of 10$^5$ to 2×10$^7$ pascals (1–200 Atm.) or higher. The nonaqueous polymerization may, if desired, be carried out in the presence of a fluorinated solvent. Suitable fluorinated solvents are inert, liquid, perfluorinated hydrocarbons, such as perfluormethylcyclohexane, perfluorodimethylcyclobutane, perfluoroctane, perfluorobenzene and the like, and inert, liquid chloro-fluorocarbons such as 1,1,2-trichloro-1,2-2-trifluoroethane, and the like. Aqueous techniques for preparing such copolymers include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583.

In addition, ion-exchange polymer resins described and prepared as in U.S. Pat. Nos. 4,267,364 to DuPont; 4,544,458 to DuPont; 4,178,218; to Asahi; 4,255,523 to Asahi; 5,082,472 to Mallouk, et al.; and 5,422,411 to Wei, et al., all incorporated by reference, can be used.

Optionally, the ion-exchange resin materials may be complemented by containing finely divided powders or other non-ionic polymers to provide final composites. Such a finely divided powder may be selected from a wide range of organic and inorganic compounds such as, but not limited to, a metal oxide, carbon black, graphite, nickel, silica, titanium dioxide, platinum black, for example, to provide specific added effects such as different aesthetic appearance (color), electrical conductivity, thermal conductivity, catalytic effects, or enhanced or reduced reactant transport properties. Examples of non-ionic polymers include, but are not limited to, polyolefins, other fluoropolymers such as polyvinylidene fluoride (PVDF), or other thermoplastics and thermoset resins. Such non-ionic polymers may be added to aid occlusion of the substrate matrix, or to enhance or reduce reactant transport properties.

Preparation of the Composites of the Invention

Composites of the invention can conveniently be prepared using a precursor ion-exchange polymer, which is in a form that makes it thermoplastic. Thus, in one approach, the microporous polymeric film support material is first almost completely imbedded into one surface of the film of the melt-processible or other precursor polymer. It was found, surprisingly, that at temperatures in excess of 290° C. the forces of gravity and capillary action are usually sufficient to achieve this purpose without the use of any additional force or pressure. This is a useful aspect of-the invention.

Accordingly, a sheet of support material can be placed on a suitable sheet of release agents, such as aluminum foil, in an oven, covered with a film of precursor polymer and heated to 290 to 340° C. for a period of 5 to 25 minutes. On the other hand, instead of resting on the release agent, the sheet of support material may also be freely suspended in the oven in a horizontal position. In either case, the process can also be performed continuously by passing the components in contact with each other through an oven or heated zone; for instance radiant heat or microwave radiation. Then the composite is turned over and the other precursor applied by the same technique.

For example, when the first polymer is a sulfonyl polymer, a combination of time and temperature is selected to partially imbed the ePTFE support material into the precursor film, preferably 50–95% of the thickness of the support material is imbedded in the precursor film. The composite is now turned upside down, a film of the carboxylate precursor polymer is placed on top of what previously had been the underside of the support material, and the heating step is repeated.

The resulting composite is then immersed in a hot solution of sodium or potassium hydroxide in order to convert both precursor polymers to their ionic sodium or potassium salt form. The time required for this conversion depends on the temperature and concentration of the caustic solution; 60 minutes at 90° C. in a 10% solution of sodium hydroxide would be a typical value. It is known that the addition of solvents such as dimenthylsulfoxide will speed up this reaction.

In another approach to the bonding process, the second step of the previous process is carried out first: A film of the carboxylate precursor polymer resting on top of a sheet of support material is heated to a temperature of 290 to 330° long enough to cause the support material to be partially (i.e. no more than 50% of its thickness) imbedded into the film. The composite formed is then converted to the carboxylate salt form by immersion into a heated solution of sodium or potassium hydroxide in water or aqueous organic mixture. After rinsing with water and drying, the remainder of the thickness of the support material is then completely impregnated with a liquid alcohol composition of the sulfonic acid polymer as. described below.

In another method, a support structure, such as a polypropylene woven fabric, or a ePTFE woven fabric may first be laminated to the untreated porous polymer film by any conventional technique, such as, hot roll lamination, ultrasonic lamination, adhesive lamination, or forced hot air lamination so long as the technique does not damage the integrity of the base material.

Alternatively, a liquid composition can be prepared containing an ion-exchange resin material in solvents such as methanol, isopropanol, dimethyl formamide or dimethylsulfoxide. Solvents that are suitable for use include, for example, alcohols, carbonates, THF (tetrahydrofuran), water, and combinations thereof. The liquid compositions may be applied to the porous film by any conventional coating technique including forwarding roll coating, reverse roll coating, gravure coating, doctor coating, kiss coating, as well as dipping, brushing, painting, and spraying so long as the liquid solution is able to penetrate the interstices and interior volume of the film. Excess liquid composition from the surface of the film may be removed. The treated film is then immediately placed into an oven to dry. For the polypropylene fabric, oven temperatures may range from 60–200° C., but preferably 120–160° C. can be used. Drying the treated membrane in the oven causes the ion-exchange resin material to become securely adhered to both the external and internal membrane surface, i.e., the fibrils and/or nodes of a porous PTFE polymer.

Additional liquid composition application steps, and subsequent drying, may be repeated. The material is turned over and the second ion-exchange resin material supplied to the other surface of the material. Typically, several treatments are needed, but the actual number of treatments is dependent on the ionomer concentration and thickness of the membrane.

Alternatively, no woven fabric need be used for the porous polymer film can be treated alone, without any supporting fabric present.

The Composites

The composite membrane has excellent long term chemical stability.

If the composite becomes damaged, the damaged area can be treated with additional ion-exchange resin.

Because the composite membrane of the present invention can be made thinner than a fabric or non-woven reinforced structure, it is possible to transport ions with lower resistance than previously has been achieved.

The composite membrane of the present invention is uniform and mechanically strong. As used herein, the term "uniform" is defined as continuous impregnation with the ion-exchange material such that no pin holes or other discontinuities exist within the composite structure. The membrane should be "occlusive", meaning that the interior volume of the porous membrane is impregnated such that the interior volume is substantially filled with the ion-exchange material and the final membrane is essentially air impermeable, having a Gurley number of greater than 10,000 seconds.

The composite membrane of the present invention may be employed in various applications, including but not limited to, polarity-based chemical separations; electrolysis; fuel cells and batteries; pervaporation; gas separation; dialysis separation; industrial electrochemistry, such as chloralkali production and other electrochemical applications.

The final composite membrane of the present invention has a uniform thickness free of any discontinuities or pinholes on the surface. The interior volume of the membrane is occluded such that the composite membrane is impermeable to non-polar gases and to bulk flow of liquids.

Optionally, and as shown schematically in FIG. 2, the composite membrane may be reinforced with a woven or non-woven material 14. Suitable woven materials may include, for example, scrims made of woven fibers of expanded porous polytetrafluoroethylene; webs made of extruded or oriented polypropylene or polypropylene netting, commercially available from Conwed, Ind. of Minneapolis, Minn.; and woven materials of polypropylene and polyester, from Tetko, Inc., of Briarcliff Manor, N.Y. Suitable non-woven materials may include, for example, a spun-bonded polypropylene from Reemay, Inc. of Old Hickory, Tenn.

One of the uses of the composite of the invention is in electrochemical cells. Such a cell comprises an anode, a compartment for the anode, a cathode, a compartment for the cathode, and a membrane which is situated to separate the two said compartments. One example is a chloralkali cell, for which the membrane should have the functional groups in salt form; in such a cell, a layer of the membrane which has carboxylic functional groups will be disposed toward the cathode compartment.

The electrochemical cell, especially a chloralkali cell, will ordinarily be constructed such that the gap or spacing between the anode and cathode is narrow, i.e., no greater than about 3 mm. It is also often advantageous to operate the cell and electrolysis process with the membrane in contact with either the anode or cathode, which can be accomplished with the aid of an appropriate hydraulic head in one cell compartment, or by using an open mesh or grid separator to urge the membrane and selected electrode into contact. It is often further advantageous for the membrane to be in contact with both the anode and cathode in an arrangement referred to as a zero-gap configuration. Such arrangements offer advantages in minimizing the resistance contributed by the anolyte and catholyte, and thus provide for operation at low voltage. Whether or not such arrangements are used, either or both electrodes can have an appropriate catalytically active surface layer of type known in the art for lowering the overvoltage at an electrode.

When used in a film or membrane to separate the anode and cathode compartments of an electrolysis cell, such as a chloralkali cell, the perfluorinated sulfonate polymers dealt with herein, after conversion to ionizable for, should have a total ion-exchange capacity of 0.5 to 3.3 meq/g (milliequivalents/gram), preferably at least 0.6 meq/g, and more preferably from 0.8 to 2.5 meq/g. Below an ion-exchange capacity of 0.5 meq/g, the electrical resistivity becomes too high, and above 3.3 meq/g the mechanical and electrochemical properties are poor because of excessive swelling of the polymer, the relative amounts of the comonomers which make up the polymer should be adjusted or chosen such that the polymer has an equivalent weight no greater than about 2000, preferably no greater than about 1600, although lower values such as 1400 or less can be used, for use as an ion-exchange barrier in an electrolytic cell. The equivalent weight above which the resistance of a film or membrane becomes too high for practical use in an electrolytic cell varies somewhat with the thickness of the film or membrane. For thinner films and membranes of the invention, equivalent weights up to about 2000 can be tolerated. Ordinarily, the equivalent weight will be at least 300, and preferably at least 500. Film of polymer having sulfonyl groups in ion-exchange form preferably will have an equivalent weight no greater than 1500 or 1600.

For the carboxylate polymers dealt with herein, when used to separate the compartments of a chloralkali cell, the requirements in respect to the ion-exchange capacity thereof differ from those of the sulfonate polymers. The carboxylate polymer should have an ion-exchange capacity of at least 0.6 meq/g, preferably at least 0.7 meq/g, and most preferably at least 0.8 meq/g, so as to have acceptably low resistance. Such values are especially applicable in the case of films having a thickness in the lower end of the specified thickness range of 10 to 100 microns; for films in the middle and upper end of this range, the ion-exchange capacity should be at least 0.7 meq/g and preferably at least 0.8 meq/g. The ion-exchange capacity should be no greater than 2.5, preferably no greater than 2 meq/g, more preferably no greater than 1.8 meq/g, and more preferably no greater than 1.3 meq/ g. In terms of equivalent weight, the carboxylate polymer most preferably has an equivalent weight in the range of 550 or 770 to 1250.

The membranes described herein can be used as a substrate to carry an electrocatalyst composition on either surface or both surfaces thereof, the resulting article being a composite membrane/electrode assembly. The thickness of the composites can be 5 mils or less.

Such electrocatalyst can be of a type know in the art, such as those described in U.S. Pat. Nos. 4,224,121 and 3,134,697, and published UK Patent Application No. GB 2,009,788A. Preferred cathodic electrocatalysts, including nobel metals on a support are preferred; for example platinum ones, such as platinum black, platinum supported on carbon black, Raney nickel and ruthenium black. Preferred anodic electrocatalysts include tungsten oxide, platinum black, silica, platinum supported on carbon black, mixed ruthenium and iridium oxides, platinum-ruthenium alloys.

The composites described herein can also be modified on either surface or both surfaces thereof so as to have enhanced gas release properties, for example by providing optimum surface roughness or smoothness, or, preferably, by providing thereon a gas and liquid permeable porous non-electrode layer or a non-porous ion permeable hydrophilic layer. Such non-electrode layer should have a porosity of 10 to 99%, preferably 30 to 70%, and an average pore diameter of 0.01 to 2000 microns, preferably 0.1 to 1000 microns, and a thickness generally in the range of 0.1 to 500 microns, preferably 1 to 300 microns, a non-electrode layer ordinarily comprises an inorganic component and a binder; the inorganic component can be of a type as set forth in published UK Patent Application No. GB 2,064,586A, preferably tin oxide, titanium oxide, zirconium oxide, or an iron oxide such as $Fe_2O_3$ or $Fe_3O_4$. Other information regarding non-electrode layers on ion-exchange membranes is found in published European patent Application No. 0.031,660, and in Japanese Laid-open patent Applications Nos. 56,108888 and 56,112487.

The binder component in a non-electrode layer, and in an electrocatalyst composition layer, can be, for example, polytetrafluoroethylene, a fluorocarbon polymer at least the surface of which is hydrophilic by virtue of treatment with ionizing radiation in air or a modifying agent to introduce functional groups such as —COOH or —$SO_3H$ (as described in published UK Patent Application No. GB 2,060,703A) or treatment with an agent such as sodium in liquid ammonia, a functionally substituted fluorocarbon polymer or copolymer which has carboxylate or sulfonate functional groups, or polytetrafluoroethylene particles modified on their surfaces with fluorinated copolymer having acid type functional groups (No. GB 2,064,586A). Such binder is suitably used in an amount of 10 to 50% by wt. of the non-electrode layer or of the electrocatalyst composition layer.

Composite structures having non-electrode layers and/or electrocatalyst composition layers thereon can be made by various techniques known in the art, which include preparation of a decal which is then pressed onto the membrane surface, application of a slurry in a liquid composition (e.g., dispersion or solution) of the binder followed by drying, screen or gravure printing of compositions in past form, hot pressing of powders distributed on the membrane surface, and other methods as set forth in No. GB 2,064,586A. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form.

Non-electrode layers and electrocatalyst composition layers can be used in combination in various ways on a membrane. For example, a surface of the membrane can be modified with a non-electrode layer, and an electrocatalyst composition layer disposed over the latter. It is also possible to place on a membrane a layer containing both an electro-catalyst and a conductive non-electrode material, e.g. metal powder which has a higher over-voltage than the electrocatalyst, combined into a single layer with a binder.

One preferred type of membrane is that which carries a cathodic electrocatalyst composition on one surface thereof, and a non-electrode layer on the opposite surface thereof.

Membranes which carry thereon one or more electrocatalyst layers, or one or more non-electrode layers, or combinations thereof, can be employed in an electrochemical cell in a narrow-gap or zero-gap configuration as described above.

The following testing procedures were employed on samples which were prepared in accordance with the teachings of the present invention.

TEST PROCEDURES

Tensile Test

Tensile tests were carried out on an Instron Model 1122 tensile strength tester, in accordance with ASTM D 638-91. Machine parameters were set as follows:

Cross head speed (in/min): 0.423 cm/sec.

Full Scale load range (lbs): 222.4 N

Humidity (%): 50

Temperature (deg F): 22.8° C.

Grip Distance: 6.35 cm

Specimens were stamped out to conform with Type (II) of ASTM D638. The specimens had a width of 0.635 cm, and a gauge length of 2.54 cm.

Thickness

Thickness of the base material was determined with the use of a snap gauge (Johannes Kafer Co. Model No. F1000/302). Measurements were taken in at least four areas of each specimen. Thickness of the dried composite membrane was also obtained with the use of the snap gauge. Thicknesses of swollen samples were not measurable with the snap gauge due to the compression or residual water on the surface of the swollen membrane. Thickness measurements of the swollen membranes were also not able to be obtained with the use of scanning electron microscopy due to interferences with the swelling agents.

Ball Burst Test

This text measures the relative strength of a sample by determining the maximum load at break. The sample is challenged with a 1 inch diameter ball while being clamped between two plates. The material is placed taut in the measuring device and pressure applied with the ball burst probe. Pressure at break is recorded.

Ionic Conductance

The ionic conductance of the membrane was tested using a Palico 9100–2 type test system. This test system consisted of a bath of 1 molar sulfuric acid maintained at a constant temperature of 25° C. Submerged in the bath were four probes used for imposing current and measuring voltage by a standard "Kelvin" four-terminal measurement technique. A device capable of holding a separator, such as the sample membrane to be tested, was located between the probes. First, a square wave current signal was introduced into the bath, without a separator in place, and the resulting square wave voltage was measured. This provided an indication of the resistance of the acid bath. The sample membrane was then placed in the membrane-holding device, and a second square wave current signal was introduced into the bath. The resulting square wave voltage was measured between the probes. This was a measurement of the resistance due to the membrane and the bath. By subtracting this number from the first, the resistance due to the membrane alone was found.

Selectivity

Two solutions of KCl, having concentrations of 1 molar and 0.5 molar, respectively, were separated using the membranes of the present invention. Two calomel reference electrodes (available from Fischer Scientific, Pittsburgh Pa., catalog number 13-620-52) were placed in each solution, and the potential difference across the membranes was recorded using a digital multimeter (available from Hewlett Packard, Englewood Calif., catalog number HP34401A). The values obtained correspond to the difference of chloride ion activity across the membrane and are reduced by the rate of anion migration across the membranes. Therefore the obtained values provide an indication of the membrane selectivity. The higher the measured voltage, the better the membrane selectivity.

Bubble Point Test

Liquids with surface free energies less than that of stretched porous PTFE can be forced out of the structure with the application of a differential pressure. This clearing will occur from the largest passageways first. A passageway is then created through which bulk air flow can take place. The air flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

The Bubble Point was measured according to the procedures of ASTM F316-86. Isopropyl alcohol was used as the wetting fluid to fill the pores of the test specimen.

The Bubble Point is the pressure of air required to displace the isopropyl alcohol from the largest pores of the test specimen and create the first continuous stream of bubbles detectable by their rise through a layer of isopropyl alcohol covering the porous media. This measurement provides an estimation of maximum pore size.

Air Flow Data

The Gurley air flow test measures the time in seconds for 100 cc of air to flow through a one square inch sample at 4.88 inches of water pressure. The sample is measured in a Gurley Densometer (ASTM 0726-58). The sample is placed between the clamp plates. The cylinder is then dropped gently. The automatic timer (or stopwatch) is used to record the time (seconds) required for a specific volume recited above to be displaced by the cylinder. This time is the Gurley number.

The Frazier air flow test is similar but is mostly used for much thinner or open membranes. The test reports flow in cubic feet per minute per square foot of material at 0.5 inches water pressure. Air flow can also be measured with the Coulter Porometer. In this test, the operator can select any pressure over a wide range. The Porometer can also perform a pressure hold test that measures air flow during a decreasing pressure curve.

BACKGROUND OF EXAMPLES

As may be appreciated by one skilled in the art, the present invention provides for an ultra-thin, integral composite membrane having thicknesses which are significantly less than the thicknesses of conventional multi-layer membranes. As a result, the membranes of the present invention provide lower electrical resistance. Also, because no porous surfaces are exposed in the present invention, there is no propensity for gasses to become trapped within the interior volume of the membrane thereby causing increased electrical resistance.

As described herein above, the ultra-thin integral composite membrane of the present invention can be advantageously employed in electrolytic processes and chemical separations. In a plate-and-frame type electrodialysis unit, the membrane of the present invention would take the place of existing cation exchange membranes. This membrane could be of the type which is laminated to a spacer screen in accordance with a specific application. Due to the higher conductance of this membrane, an electrodialysis unit could employ less membrane to achieve a given flux rate, thereby saving space and cost. If equipment is retro-fitted with this membrane, the voltage requirements would be reduced at a given current, or higher current could be run at a given voltage. Also, in a diffusion dialysis system, a given unit employing the membrane of the present invention would provide a higher flux.

A fuel cell, utilizing the membrane of the present invention, operates at a higher voltage for a given current density due to the improved ionic conductance of this membrane.

Also, due to improved water transport across the membrane, high limiting current may be achieved with less fuel gas humidification, as compared to membranes which have been employed heretofore. All samples of ePTFE provided in the following examples were made in accordance with the teachings of U.S. Pat. No. 3,953,566. Representative ePTFE membranes may have the following:

|  | Membrane 1 | Membrane 2 |
|---|---|---|
| Gurley (sec.) | 3.3 | 0.9 |
| Bubble Point (psi) | 28.3 | 32.6 |
| Mass/Area (g/m$^2$) | 6.1 | 4.4 |
| Density (g/cc) | 0.65 | 0.77 |
| Longitudinal Maximum Load (lbs.) | 1.76 | 2.18 |
| Transverse Maximum Load (lbs.) | 2.33 | 1.31 |

As may be appreciated by one skilled in the art, ePTFE membranes can be made with a wide range of physical property values.

Without intending to limit the scope of the present invention, the apparatus and method of production of the present invention may be better understood by referring to the following examples.

EXAMPLE 1

A film of perfluorinated carboxylic ion-exchange resin in its methyl ester precursor form obtained through W. L. Gore & Associates, Inc., was formed into a film by melt pressing a small quantity (approximately 1.5 gm) of resin in a hydraulic press preheated to 280° C., using a 25 micron aluminum spacer. A film of approximately 40 microns in thickness was formed by applying a pressure of 750 psi for 1 minute.

This film, while still in the melt processable precursor form, was laminated to an expanded porous PTFE (ePTFE) membrane approximately 15 microns thick with a porosity of 65% obtained from W. L. Gore & Associates, Inc. The lamination was carried out by slightly stretching the film over the ePTFE membrane and restraining the structure to hold both the film and the membrane taunt. This assembly was placed in a 300° C. oven for 1 minute. The film melted into the ePTFE membrane to a depth of approximately 10 microns to form a composite as measured by measuring the thickness of the starting film and membrane and measuring the thickness of the composite.

The composite was soaked in a 5% KOH solution overnight to convert the methyl ester precursor form to the K+ ionomer form.

The uncoated side of the ePTFE membrane was then filled with a solution of perfluorinated sulfonic acid (PFSA) ionomer in a suitable solvent by brushing the solution onto the uncoated side. The solution comprised 6% PFSA ionomer of 1100 equivalent weight (available from E. I. DuPont Company under the Nafion trademark) in ethanol. The ethanol was driven off with heat. The filling process was repeated 4 additional times until a slight excess of perfluorinated sulfonic acid resin coated the surface, completely encapsulating the ePTFE membrane. The total thickness of the structure was 50 microns.

This structure is improved over existing commercially available bi-layer membranes due to:

(a) prevention of delamination of the carboxylic acid ionomer layer from the sulfonic acid ionomer layer due to the mechanical bond between the two ionomers and the ePTFE membranes;

(b) elimination of the woven PTFE fabric used to reinforce the ionomer and provide dimensional stability. Fabrics are expensive due to the multiple steps of procuring fiber, weaving the fibers, and then ionomer lamination to the fabric. Each stage has requisite yield losses;

(c) higher ionic conductance feasible due to the thinness of the overall structure (fabric reinforced structures are inherently thick).

EXAMPLE 2

A composite membrane was prepared by mixing a liquid polyethyleneimine anion-exchange resin (Polymin by BASF) with a diepoxy crosslinking agent (Bisphenol F from Ciba Geigy) and coating onto an expanded PTFE membrane (GORE-TEX® membrane 80% porous 1.7 mils thick). The anion resin was forced into the pores from the surface of one side of the ePTFE by using a heated roll nip before the resin had time to crosslink. The anion resin then completed crosslinking with time. The thickness of the anion resin layer was 1.7 mils with 50% imbedded in the ePTFE support. The opposite side was then filled with cation exchange resin by applying a liquid composition of perfluorosulfonic acid copolymer (Flemion 950 EW from Asahi Glass) 9% by weight in ethanol and drying between applications. Three applications of the liquid composition were sufficient to completely fill all void spaces in the ePTFE matrix. The final composite measured 3 mils thick.

EXAMPLE 3

A composite membrane was prepared with two different equivalent weights of the PFSA ionomer. A GORE-TEX® membrane with an initial porosity of 80% and a thickness of 1.7 mils was filled on its first side with a PFSA polymer of an EW of 1500 (from E. I. DuPont de Nemours & Co., Inc.) by applying a 10% by weight liquid composition of the 1500 PFSA in methanol so that it wet the surface of the ePTFE but did not penetrate all the way through. The solvent was driven off by the gentle application of heat and the procedure was repeated until a slight excess of ionomer remained above the ePTFE substrate after all the solvent was driven off. This took an additional two applications for a total of three applications. A continuous layer of 1500 EW PFSA polymer was thus formed on one side only of the support membrane. To the second side of the GORE-TEX® membrane, a 9% by weight of 950 EW polymer (Flemion from Asahi Glass) in ethanol was applied and allowed to fully penetrate the substrate until it reached the 1500 EW layer. This was readily apparent by a change of the ePTFE membrane from translucent to clear. The solvent was driven off and the process repeated until all available pore volume of the ePTFE support was filled. The entire structure was then heat treated by placing it in an 140° C. oven for 1.5 minutes to "lock" the PFSA polymer in the structure so it could not be removed by solvents at normal temperatures and pressures. The final thickness of the composite membrane was 1.3 mils due to some collapse of structure. The selectivity measured 90% and the conductance measured 6.7 S/cm$^2$.

EXAMPLE 4

A composite membrane was prepared following the same procedure as Example 3 with the difference that an additional heat treatment was performed after the first side of the ePTFE membrane had been filled with 1500 ionomer but before the second side was filled with 950 EW ionomer to lock the PFSA in the structure. This renders the first layer of PFSA stable in the membrane and prevent any possibility of undesirable effects due to the solvent used in the application of the second ionomer layer.

EXAMPLE 5

A membrane was prepared as described in Example 3 with the difference that the ePTFE support membrane used was an ePTFE membrane 0.9 mils thick and 85% porous laminated on one side to a woven ePTFE fabric consisting of 78×78 threads per inch of 100 denier fiber. The ePTFE membrane side was filled first with 1500 EW ionomer, then the second side (towards the woven fiber) was filled with 950 EW. Five coats were applied to provide a slight excess of ionomer above the ePTFE membrane in the window area of the weave. Selectivity on this composite measured 91% with a conductance of 2.1 S/cm$^2$.

We claim:

1. A composite membrane consisting essentially of
   a support of a microporous polymeric sheet in laminar attachment with a porous fabric said support having impregnated in the pores on one side thereof a first ion-exchange material, and having impregnated on the opposing side a second ion-exchange material; each of said first and second ion-exchange materials fully filling and occluding the pores at least near the surface of the one side and the opposing side, respectively, of said support, and wherein said first and second ion-exchange materials differ from one another in structure, functional groups, or equivalent weight, or a combination of such.

2. The composite membrane of claim 1 wherein all pores of the sheet are filled and occluded with said first and second ion-exchange materials.

3. The composite membrane of claim 2 wherein one of said first and second ion-exchange materials occupies more of the pore volume of said microporous polymeric sheet than the other one of said first and second ion-exchange materials.

4. The composite membrane of claims 1, 2, or 3 wherein the thickness of the composite membrane is less than 5 mils.

5. The composite membrane of claims 1, 2, or 3 wherein the first and second ion-exchange materials each consist essentially of at least one fluorinated ionic polymer.

6. The composite membrane of claim 5 wherein the microporous polymeric sheet is a microporous expanded polytetrafluoroethylene sheet.

7. The composite membrane of claim 5 wherein the fluorinated ionic polymer is a cationic ion-exchange material.

8. The composite membrane of claim 7 wherein the the cationic ion-exchange material consists essentially of a carboxylic or sulfonic functionality.

9. The composite membrane of claim 2 wherein the first, the second, or the first and second ion-exchange material contains a finely divided powder.

10. The composite membrane of claim 9 wherein the powder is a metal oxide.

11. The composite membrane of claim 2 wherein the first, the second, or the first and second ion-exchange material contains a non-ionic polymer.

12. The composite membrane of claim 2 wherein at least one of the first or second ion-exchange materials is coated with an electrocatalyst.

13. The composite membrane of claim 1 wherein the microporous polymeric sheet is a microporous expanded polytetrafluoroethylene sheet.

14. The composite membrane of claim 1 wherein the composite membrane is located in a separation apparatus.

15. The composite membrane of claim 1 wherein the composite membrane is located in an electrochemical cell.

16. An assembly comprising a plurality of the composite membranes of claim 1 stacked in layers.

17. The composite membrane according to claim 1, wherein the thickness of the microporous polymeric sheet is between 0.06 mils and 1.6 mils.

18. The composite membrane according to claim 1, wherein the thickness of the microporous polymeric sheet is between 0.5 mils and 1.5 mils.

19. The composite membrane according to claim 1, wherein the microporous polymeric sheet has a porosity of greater than 35%.

20. The composite membrane according to claim 1, wherein the microporous polymeric sheet has a porosity between 70% and 95%.

21. The composite membrane of claim 1, wherein the porous fabric is woven expanded polytetrafluoroethylene.

22. The composite membrane of claim 21, wherein the woven expanded polytetrafluoroethylene has a window area of the weave, and impregnation of ion exchange material is carried out through the window area of the weave.

23. The composite membrane of claim 1, wherein impregnations of the first and second ion exchange materials are carried out by solution impregnation.

24. The composite membrane of claim 1, wherein the first and second ion-exchange materials are each polymer ion-exchange materials.

25. The composite membrane of claim 1, wherein the composite membrane provides a Gurley number of greater than 10,000 seconds.

26. The composite membrane of claim 1, wherein the support of microporous polymeric sheet is hydrophobic.

27. The composite membrane of claim 1, wherein the support of microporous polymeric sheet is hydrophobic, wherein the porous fabric is woven expanded polytetrafluoroethylene, wherein impregnations of the first and second ion exchange materials are carried out by solution impregnation, and wherein the first and second ion-exchange materials are each polymer ion-exchange materials.

28. The composite membrane of claim 1, wherein the composite membrane is air impermeable.

* * * * *